United States Patent [19]
Crow

[11] Patent Number: 5,364,070
[45] Date of Patent: Nov. 15, 1994

[54] HIGH PRESSURE MICRO VALVE

[75] Inventor: Lowell Crow, Danville, Calif.

[73] Assignee: Transamerican Technologies International, Pleasanton, Calif.

[21] Appl. No.: 95,887

[22] Filed: Jul. 22, 1993

[51] Int. Cl.⁵ ............................................. F16K 1/48
[52] U.S. Cl. .................................... 251/322; 251/323
[58] Field of Search ....................... 251/321, 322, 323

[56] References Cited

U.S. PATENT DOCUMENTS

| | | | |
|---|---|---|---|
| 775,719 | 11/1904 | Davidson . | |
| 891,284 | 6/1908 | Nethery | 251/322 X |
| 1,852,069 | 4/1932 | Wollheim | 251/322 X |
| 2,287,992 | 6/1942 | Grove | 251/322 X |
| 3,148,700 | 9/1964 | Friedell | 251/322 X |
| 3,730,224 | 5/1973 | Prisk | 251/322 X |
| 4,062,517 | 12/1977 | Jones | 251/322 |
| 4,316,600 | 2/1982 | Parise | 251/321 X |
| 5,064,168 | 11/1991 | Raines et al. . | |

Primary Examiner—Robert G. Nilson
Attorney, Agent, or Firm—Graham & James

[57] ABSTRACT

A bi-directional flow valve for use in regulating flow of pressurized fluids in surgical instruments is disclosed. The valve comprises a valve body having an axial bore of variable radius, a plunger axially and slidably mounted within the bore of the valve body, a flange provided on the plunger for circumferentially engaging the bore at its narrowest point, a spring means for urging the flange against the bore at its narrowest point, and seal means to seal the gap between the plunger and the bore, and displacement means to move the plunger and flange out of contact with the bore so that fluid may pass through the bore and thus through the valve.

14 Claims, 2 Drawing Sheets

HIGH PRESSURE MICRO VALVE

FIELD OF THE INVENTION

The invention generally relates to push button valves, and more particularly to an improved bi-directional push button valve capable of operating under high pressures for use in media in medical applications.

BACKGROUND OF THE INVENTION

Over the past several years, laparoscopy has become an important means for conducting minimally invasive surgery. Because trauma to the patient is greatly reduced, as compared with traditional invasive surgical techniques, patient discomfort and post-operative recovery time are greatly reduced.

Laparoscopic surgery utilizes elongated, hollow tubes called cannulae both to deliver and remove fluids from the site to be operated upon. In the case of fluid delivery, it is highly desirable to control both the flow rate and the force with which the fluid is carried to the surgical site. A variety of valves have been employed to achieve this desired control.

Valves currently used in conjunction with laparoscopic surgery comprise two basic styles, one employing a hole through the piston through which fluid passes, the other employing an hourglass-style piston with the fluid traversing around the waist of the hourglass.

Existing valve styles employ a metal housing surrounding a metal piston that moves up and down through the housing. The valve components are manufactured with close mechanical tolerances and require extensive lubrication in order to avoid jamming or sticking during operation. Such valves lack any sealing means, other than the seal provided by the lubricated contact of the piston with the valve housing.

Recently, laparoscopic techniques have come to depend upon the delivery of fluids at relatively high pressure. Known valves, such as those described, suffer several drawbacks when used to deliver fluids under high pressure. First, and most importantly, such valves leak extensively because there are no seals. Second, with some types of metallic valves, such as those fabricated from brass, the metallic surfaces of the piston and the housing oxidize to form extensive residue. Accumulated residue often causes the valves to stick or "freeze up". Finally, because the valve components are tooled to such narrow tolerances, they must be meticulously cleaned and relubricated after each use. Failure to carry out such procedures also results in valve failure.

Given the limitations of valves currently used for surgical applications, it is desirable to have a valve that is simple, easy to disassemble and clean, reliable, and would operate leak free under high pressures and with pressure gradients in either direction.

SUMMARY OF THE INVENTION

In accordance with the invention an improved intermittent usage, normally closed, bi-directional valve is presented. The valve can be used to control flow of liquids, gases, or suction. The valve is designed to work with pressure differentials and flows of either direction. It is operated by pressing a button that depresses a plunger that blocks flow in the closed state.

An important advantage of the invention is the use of o-ring type seals in the valve. These seals prevent leakage, allowing operation under higher pressures, as well as reducing the manufacturing tolerances required for proper operation. Use of the o-rings further eliminates the need for lubrication to maintain proper function.

Another advantage of the current invention is the ease of disassembly and cleaning. The valve can be disassembled with minimal effort without the use of tools. The compression spring is retained in the cap, preventing loss of the spring while cleaning.

These and other advantages and features of the invention will become apparent upon consideration of the drawings and description of the invention that immediately follows.

DETAILED DESCRIPTION OF THE INVENTION

Figure 1:
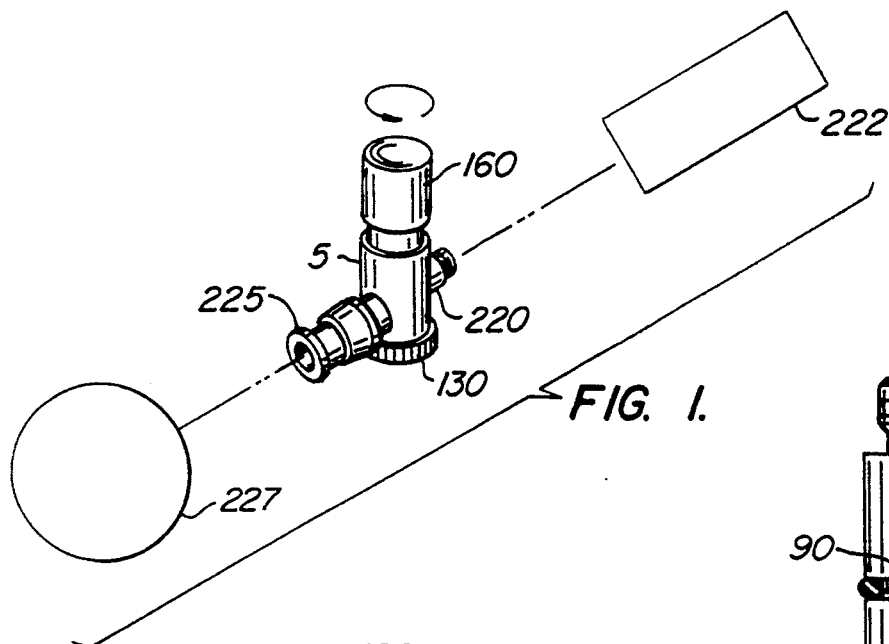
FIG. 1 is a perspective view showing the preferred embodiment of the invention in an assembled condition with the laparoscopic surgical instrument and fluid or vacuum source attached thereto in black box representations.
Figure 2:
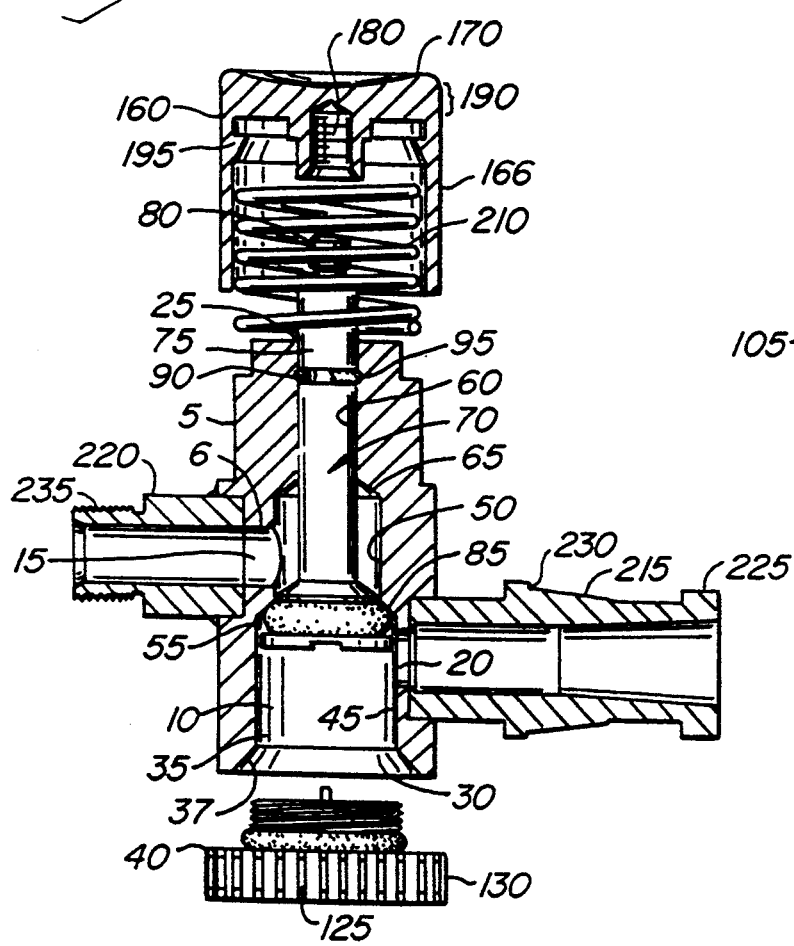
FIG. 2 is a front cross-sectional view of the preferred embodiment of the invention showing the arrangement of the components of the valve.
Figure 3:
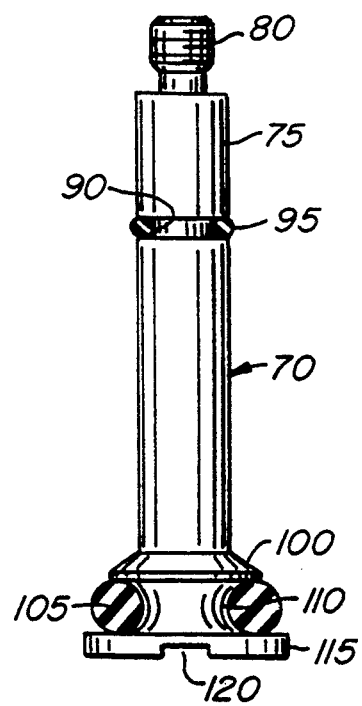
FIG. 3 is an axial cross section of the plunger assembly.
Figure 4:
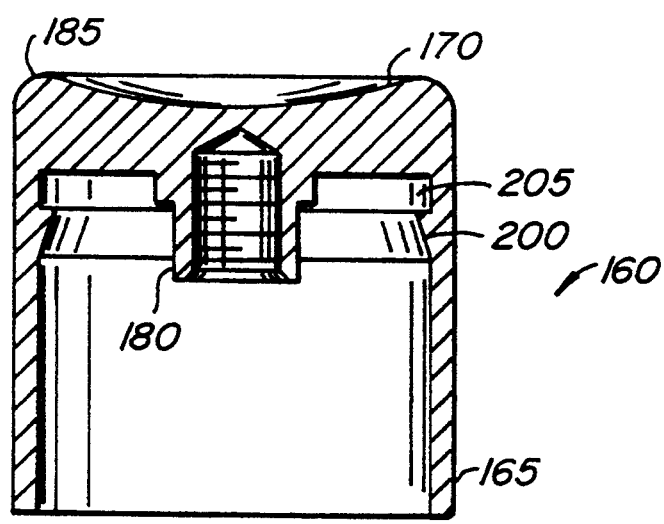
FIG. 4 is a cross-sectional view of the push button showing the internal configuration.
Figure 5:
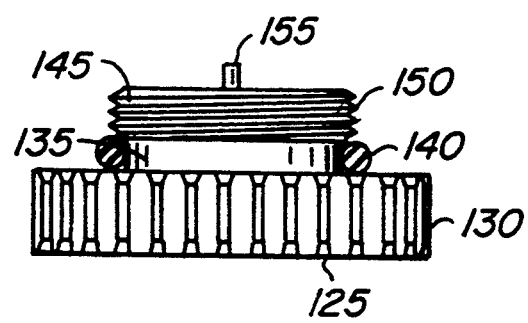
FIG. 5 is a side view of the end cap.

Referring to the figures, the invention will now be described. The invention comprises a generally cylindrical valve body 5 having a generally cylindrical co-centric bore 10 of varying radius and a first port 20 and a second port 15. The first port 20 is connected to the first nipple 215 terminating in a female luer fitting 225 and having a "christmas tree" connector 230 integrally placed on the nipple body 215. Luer fitting 225 may be connected to a pressurized fluid source or a vacuum source 227. The second port 15 is connected to the second nipple 220 having an external thread for connection to the surgical instrument such as generically shown in black box representation as box 222.

The bore 10 has an upper open end 25 and a lower open end 30 with the lower open end 30 of the bore 10 being internally threaded 35 to receive the end cap 40 and having an internal chamfered edge 37. The bore 10 has three co-centric sections along its axis, each having a constant radius. The first bore section 45 has the largest radius and is proximal to the lower open end 30. The first port 20 opens onto the first bore section 45.

The second bore section 50 joins the end of the first bore section 45 distal to the lower open end 30 and is of smaller radius. The first constriction 55 between the first bore section 45 and the second bore section 50 is a smooth taper from the radius of the first bore section 45 to the radius of the second bore section 50 having an axial extent approximately equal to the radial change. The second port 15 opens onto the second bore section 45.

The third bore section 60 joins the end of the second bore section 50 proximal to the lower open end 30 and has the smallest radius of the three sections 45, 50, 60. The second constriction 65 between the second bore section 50 and the third bore section 60 is a smooth taper from the radius of the second bore section 50 to the radius of the third bore section 60 having an axial extent approximately equal to the radial change.

A plunger assembly 70 is disposed in the bore 10 and axially moveable therein. The plunger assembly 70 comprises a cylindrical shaft 75 and a radial flange assembly 85. The shaft 75 begins with an externally threaded end 80 that protrudes through the first open end 25 of the bore 10 to engage the push button 160 then extends through the third bore section 60 ending at the radial flange assembly 85. The shaft 75 has radius slightly smaller than the third bore section 60 and a circumferential notch 90 disposed on the shaft 75 so as to be within the axial extent of the third bore section 60 in the open and closed valve positions. The notch 90 retains an rubberized shaft o-ring 95 which makes contact with the inside of the third bore section 60 preventing axial flow along the shaft 75.

The radial flange assembly 85 has a guide taper 100 beginning at the point of connection to the shaft 75. The guide taper starts with a radius matching that of the shaft 75 then flares out to a radius slightly less than that of the second bore section 50. Adjacent to the guide taper 100 on the side distal to the shaft 75 is the flange o-ring 105. The flange o-ring 105 has an outer radius between the radius of the first bore section 45 and that of the second bore section 50, and having cross-sectional radius approximately equal to the axial extent of the first constriction 55. When urged against the first constriction 55, the flange o-ring 105 acts to seal the junction between the radial flange assembly 85 and the first constriction 55 preventing flow between the first bore section 45 and the second bore section 50. The flange o-ring 105 is retained in the flange groove 110 which has a half-circle cross-section. The flange assembly is completed by a flange disk 115, having a ratio of radius to thickness of about 5:1, adjacent to the flange groove 110 on the side opposite the guide taper 100. The flange disk 115 has a slot 120 in the side distal to the flange groove 100. The slot 120 runs edge to edge and has rectangular cross-section having depth equal to about one-half the thickness of the flange disk 115 and width approximately twice the thickness of the flange disk 115.

The push button 160 is composed of a top disk 170 providing a surface for applying pressure to during operation. The top disk 170 has a co-centric cylindrical protrusion 180 on the bottom side. The protrusion 180 being internally threaded to engage the threaded end 80 of the shaft 75 and providing additional structural coupling between the push button 160 and the shaft 75. The top disk 170 is knurled 185 around the outside edge allowing it to be easily gripped for screwing on and off and has a thin cylindrical skirt 165 extending downward having internal radius slightly larger than the external radius of the valve body 5 around the third bore section 60 allowing it to pass over the valve body 5 when the valve is operated. The inside surface of the skirt 165 has a small circumferential hook 195 proximal to the top disk 180. The hook has a gradual taper 200 reducing the internal radius and a flat top 205 proximal to the top disk 170.

A spring 210 fits inside the skirt 165 and rests against the bottom of the top disk 170. The hook 195 acts to retain the spring 210 in the push button 160 upon disassembly to prevent loss. The end of the spring 210 distal to the top disk 170 is engage in a circumferential spring notch 215 in the exterior of the valve body 5 at outer corner proximal to the first open end 25. The compression of the spring 210 provides the axial force to urge the flange assembly 85 against the first constriction 55 to close the valve. The tension in the spring 210 is sufficient to overcome the downward force on the plunger assembly 70 present where the valve is used to control a vacuum source attached to the first port 20 allowing the valve to control flows in either direction.

The end cap 40 has a knurled disk 125 having radius slightly greater than that of the valve body 5 and knurled edges 130. The extended radius and knurled edges 130 allow the end cap to be unscrewed by hand. On the side of the knurled disk 125 proximal to the valve body 5 is a co-centric second disk 135 sized to retain the end cap o-ring 140. The end cap o-ring 140 has ring radius sized to make continuous contact with the chamfered edge 37 of the valve body 5 when the end cap 40 is in place. The end cap 5 has a co-centric third disk 145 that is threaded 150 on its edges so as to screw into the internal threads 35 of the second open end 30 of the valve body 5. The third disk 145 has a raised bar 155 of rectangular cross-section extending from edge to edge on the side proximal to the flange assembly 85. The bar 155 is to engage the flange slot 120 to prevent the plunger assembly 70 from rotating when it is fully depressed. This allows the push button 160 to be screwed on or off the threaded end 80 of the shaft 75 without need for externally fixing the plunger assembly 70 to prevent rotation.

The features and advantages of the invention will now be apparent. First, the valve of the invention is advantageous over existing constructions in that it allows for a bi-directional movement of fluid at high pressure without leakage problems suffered by known valves. Further, the valve of the invention is easier to use and far easier to clean than known valves.

Although the invention has been described with respect to certain illustrated embodiments, it will be understood to one skilled in the art that variations and modifications can be made without departing from the scope of this invention, which is to be defined by the claims that follow.

What is claimed is:

1. A bi-directional flow valve in combination with a laparoscopic surgical instrument connected to a vacuum source, comprising:

a bi-directional flow valve having a valve body;

a laparoscopic surgical instrument having a cannula connected to said flow valve;

said valve body having a generally cylindrical bore with an open end and first and second ports between said bore and exterior of the valve body, the first port being proximal to the open end with the radial projection of the internal opening of the first port onto the axis of said bore being separated axially along the bore by a constriction in the radius of said bore from the radial projection of the internal opening of the second port onto the axis of said bore said valve operable with a vacuum source connected to said first port;

a plunger disposed along the axis of said bore, having a generally cylindrical shaft of radius less than the constriction in bore, said shaft projecting through said constriction and said open end of said bore and having a generally circularly symmetric radial flange disposed in said bore on the side of said constriction opposite said open end, said flange being solid and said flange having a radius greater than the inside radius of the constriction in the bore and less than the radius of the bore adjacent to the constriction on the side thereof which the flange is disposed, said plunger being disposed in said bore so as to move axially along said bore so that said flange may abut said constriction at one extreme of axial displacement making substantially continuous circumferential contact thereto;

a spring to resiliently urge said flange against said constriction so as to interrupt flow between the two said ports said spring means having sufficient resiliency to counteract the force exerted through said vacuum source applied through said first port and acting on said plunger;

a circumferential sealing means to seal the gap, if any, between inside of said bore and outside of said plunger shaft, said seal occurring at some location between the open end of said bore and the closest edge thereto of the first port;

a displacement means to move said plunger in said bore to create an open path of flow between the two said ports by moving said flange away from said constriction; and wherein said cannula and said bi-directional flow valve allow fluid to flow in either direction through the first and second ports.

2. The invention of claim 1 wherein the displacement means is comprised of a push-button fixedly attached to end of said plunger providing a surface suitable for operation by the pressure of a thumb or finger.

3. The invention of claim 2 wherein the push-button is internally threaded and screwed onto a matching external thread on the end of said plunger shaft.

4. The invention of claim 2 wherein the spring is a cylindrical spring compressed between the valve body and the proximal side thereto of said push-button.

5. The invention of claim 4 wherein the push-button contains means to retain said spring fixedly to itself upon removal of the push-button from the end of said shaft.

6. The invention of claim 1 wherein the sealing means is an o-ring surrounding said plunger shaft.

7. The invention of claim 1 wherein the bore in the valve body has a second open end, said second open end being internally threaded to receive an end cap, said end cap having matching external threads with the joint between the end cap and second open end having end cap sealing means to seal said joint.

8. The invention of claim 7 wherein the end cap sealing means is an o-ring retained on the end cap.

9. The invention of claim 7 wherein the end cap sealing means is an o-ring retained in the second open end.

10. The invention of claim 3 wherein the surface of the end cap forming the end of the bore contains an engagement means to rotationally engage the bottom of the plunger when the plunger is depressed, preventing the plunger from rotating and allowing the push-button to be screwed on or off without otherwise holding the plunger.

11. The invention of claim 10 wherein the engagement means is a comprised of a slot in the end of the plunger proximal to the end cap perpendicular to the major axis of the plunger and a bar that engages into said slot when plunger is depressed, said bar being attached to the surface of the end cap interior to the bore.

12. The invention of claim 10 wherein the end cap provides a means for gripping allowing it to be screwed in or out by hand.

13. The invention of claim 1 wherein an o-ring is attached to the flange so that said o-ring provides the contact area between the plunger and the constriction in the bore.

14. The invention of claim 1 wherein the spring provides sufficient force to overcome any force created on the plunger by pressure differentials between the first and second ports tending to urge the flange away from the constriction.

* * * * *